Jan. 8, 1957  C. F. TARRANT  2,776,479
CHEESE SHREDDER
Filed June 6, 1955

Carl F. Tarrant
INVENTOR.

BY *Clarence A. O'Brien*
*and Harvey B. Jacobson*
Attorneys

United States Patent Office 2,776,479
Patented Jan. 8, 1957

2,776,479

CHEESE SHREDDER

Carl F. Tarrant, Webb City, Mo.

Application June 6, 1955, Serial No. 513,327

5 Claims. (Cl. 30—117)

This invention generally relates to a cheese shredder and more specifically provides a device for shredding cheese into long, thin uniform strips which may be utilized as decorative additions to dishes of foodstuffs, such as in conjunction with casseroles of macaroni and cheese or scalloped potatoes, apple pie and the like.

An object of the present invention is to provide a cheese shredder having a handle in conjunction with a knife edge for slicing cheese wherein means is provided for adjusting the thickness of the cheese being sliced.

Another object of the present invention is to provide a cheese shredder having a knife for cutting the cheese together with a plurality of spaced wire members associated with the knife edge wherein the cheese is shredded into long strips after it has been sliced.

Still another important object of the present invention is to provide a cheese shredder in conformance with the preceding objects in which improved and novel mounting means is provided for mounting the adjusting means for the thickness of the slice and for mounting the shredding members.

Other important objects of the present invention reside in its simplicity of construction, ease of operation, effectiveness for its purposes and its relatively inexpensive manufacturing cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
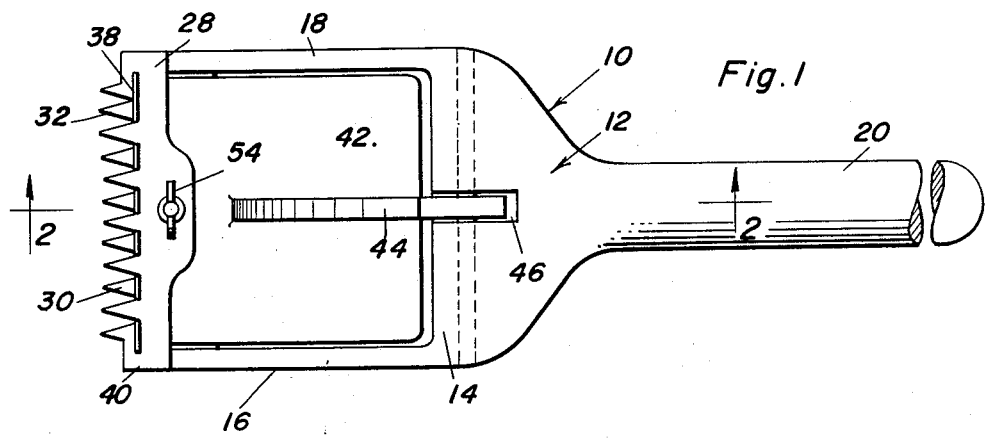
Figure 1 is a top plan view of the cheese shredder of the present invention.
Figure 2:
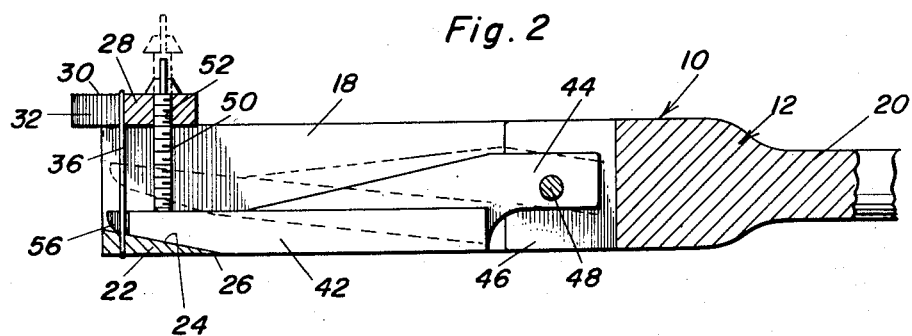
Figure 2 is a longitudinal, vertical section view taken substantially upon a plane passing along section line 2—2 of Figure 1 illustrating the details of construction of the device; and, Figure 3 is an end elevational view looking at the front end of the cheese shredder.
Figure 3:
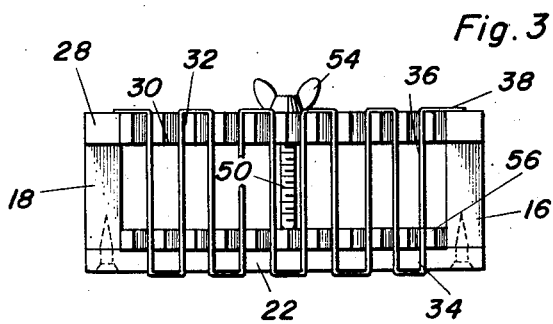

Referring now specifically to the drawing, it will be seen that the numeral 10 generally designates the cheese shredder of the present invention including a generally U-shaped frame member 12 having a bight portion 14 and spaced legs 16 and 18. Projecting from the bight portion 14 of the frame 12 is an elongated handle 20 for operation of the cheese shredder 10.

Interconnecting the lower ends of the leg members 16 and 18 at the outer free ends thereof is an interconnecting member 22 that is provided with an inclined upper surface 24 terminating in facing relation to the bight portion 14 of the handle 12 in a knife or sharpened edge 26. The sharpened edge 26 is in substantially the same plane as the bottom of the bight portion 14 of the frame 12 for engagement with cheese wherein cheese will be sliced by the knife edge 26 when the handle 20 and the frame 12 are moved across a piece of cheese for moving the knife edge thereacross.

Interconnecting the upper edges of the free ends of the legs 16 and 18 is an upper member 28 having a plurality of forwardly projecting V-shaped projections 30 forming V-shaped notches 32 in the outer free edge thereof. Also, the outer edge of the interconnecting member 22 is provided with a plurality of slots 34 which are in alignment with the bottoms of the notches 32. An endless wire member 36 is looped through the slots 34 and around the bases of the projections 30 thereby forming a plurality of spaced wire members having terminal ends 38 secured in horizontal grooves 40 in the upper surface of the interconnecting member 28 thereby forming a plurality of spaced wires for engagement of a slice of cheese after it has passed the knife edge 26 for shredding the slice of cheese.

The depth plate 42 is provided with a projecting and offset portion 44 pivotally secured in a notch 46 in the bight portion 14 of the frame 12 by a transverse pivot pin 48. The other end of the plate 42 is provided with an inclined lower edge complementary to the inclined surface 24 on the interconnecting member 22. A screw-threaded member 50 is inserted through an aperture 52 in the interconnecting member 28 and provided with a wing nut 54 on the upper end thereof and the lower end engages the upper surface of the plate 42 wherein the movement of the plate 42 away from the knife edge 26 may be adjusted thereby varying the thickness of the slice of cheese that will pass between the depth plate 42 and the knife edge 26 thereby varying the thickness of cheese sliced by the device.

The free edge of the plate 42 is provided with a plurality of V-shaped notches 56 for receiving the wire members 36 in the bottom thereof whereby the slice of cheese will be guided into and between the wire members 36 thereby slicing the slice of cheese into a plurality of relatively long and narrow strips.

It will be understood that the device of the present invention may be constructed of any suitable material which lends itself to easy cleaning and is acceptable for use in the kitchen. In operation, the handle 20 is grasped and the device is moved over a piece of cheese wherein the knife edge 26 slices a slice therefrom as determined by the adjustment of the screw 50 as to the thickness and this slice of cheese proceeds through and between the wire member 36 for shredding the cheese into relatively long, narrow strips which may be utilized for various purposes in preparing food dishes thereby eliminating the necessity of a long and tedious shredding operation by a conventional kitchen knife.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A cheese shredder comprising a generally U-shaped frame, a handle attached to the bight portion of said frame, a pair of spaced members, one overlying the other, said members interconnecting the free ends of the legs of the frame, a plurality of spaced wire members disposed between said interconnecting members, the bottom of said interconnecting members having a sharpened edge facing the bight portion of said frame for cutting a slice of cheese, a depth plate supported on said frame for gaging the thickness of the cheese sliced by the sharpened edge, said plate guiding the slice of cheese between the wire members thereby shredding the cheese slice into strips.

2. A cheese shredder comprising a generally U-shaped frame, a handle attached to the bight portion of said frame, a pair of spaced members, one overlying the other, said members interconnecting the free ends of the legs of the frame, a plurality of spaced wire members disposed between said interconnecting members, the bottom of said interconnecting members having a sharpened edge facing the bight portion of said frame for cutting a slice of cheese, a depth plate supported on said frame for gaging the thickness of the cheese sliced by the sharpened edge, said plate guiding the slice of cheese between the wire members thereby shredding the cheese slice into strips, said depth plate being pivotally attached to the bight portion of said frame with the free end overlying the bottom interconnecting member, an adjustable stop screw extending through the top interconnecting member and engaging the upper surface of the plate for limiting the movement of the plate away from the sharpened edge for determining the thickness of the cheese sliced by the edge.

3. A cheese shredder comprising a generally U-shaped frame, a handle attached to the bight portion of said frame, a pair of spaced members, one overlying the other, said members interconnecting the free ends of the legs of the frame, a plurality of spaced wire members disposed between said interconnecting members, the bottom of said interconnecting members having a sharpened edge facing the bight portion of said frame for cutting a slice of cheese, a depth plate supported on said frame for gaging the thickness of the cheese sliced by the sharpened edge, said plate guiding the slice of cheese between the wire members thereby shredding the cheese slice into strips, the top of said interconnecting members having a plurality of V-shaped notches in the outer edge thereof, said bottom of the interconnecting members having slots vertically aligned with the bottoms of the notches, said wire members being formed from a continuous wire looped through the slots and notches with the terminal ends rigidly secured.

4. A cheese shredder comprising a generally U-shaped frame, a handle attached to the bight portion of said frame, a pair of spaced members, one overlying the other, said members interconnecting the free ends of the legs of the frame, a plurality of spaced wire members disposed between said interconnecting members, the bottom of said interconnecting members having a sharpened edge facing the bight portion of said frame for cutting a slice of cheese, a depth plate supported on said frame for gaging the thickness of the cheese sliced by the sharpened edge, said plate guiding the slice of cheese between the wire members thereby shredding the cheese slice into strips, said depth plate being pivotally attached to the bight portion of said frame with the free end overlying the bottom interconnecting member, an adjustable stop screw extending through the top interconnecting member and engaging the upper surface of the plate for limiting the movement of the plate away from the sharpened edge for determining the thickness of the cheese sliced by the edge, the top of said interconnecting members having a plurality of V-shaped notches in the outer edge thereof, said bottom of the interconnecting members having slots vertically aligned with the bottoms of the notches, said wire members being formed from a continuous wire looped through the solts and notches with the terminal ends rigidly secured.

5. The combination of claim 4 wherein said plate is provided with a plurality of V-shaped notches in the free end thereof for receiving the wire members therebetween.

References Cited in the file of this patent

UNITED STATES PATENTS

| | | |
|---|---|---|
| 935,517 | Johnson | Sept. 28, 1909 |
| 2,355,312 | Lui | Aug. 8, 1944 |